UNITED STATES PATENT OFFICE.

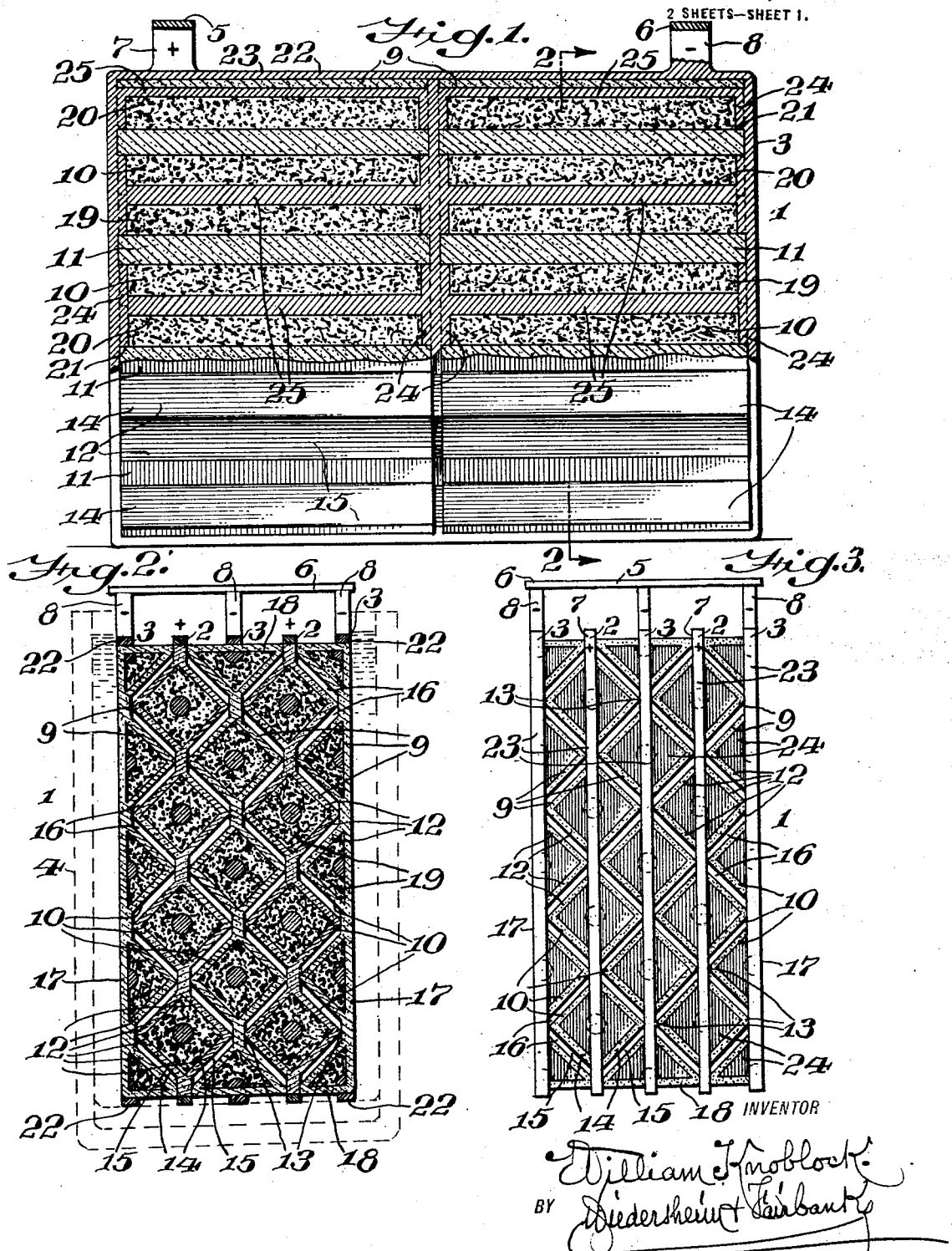

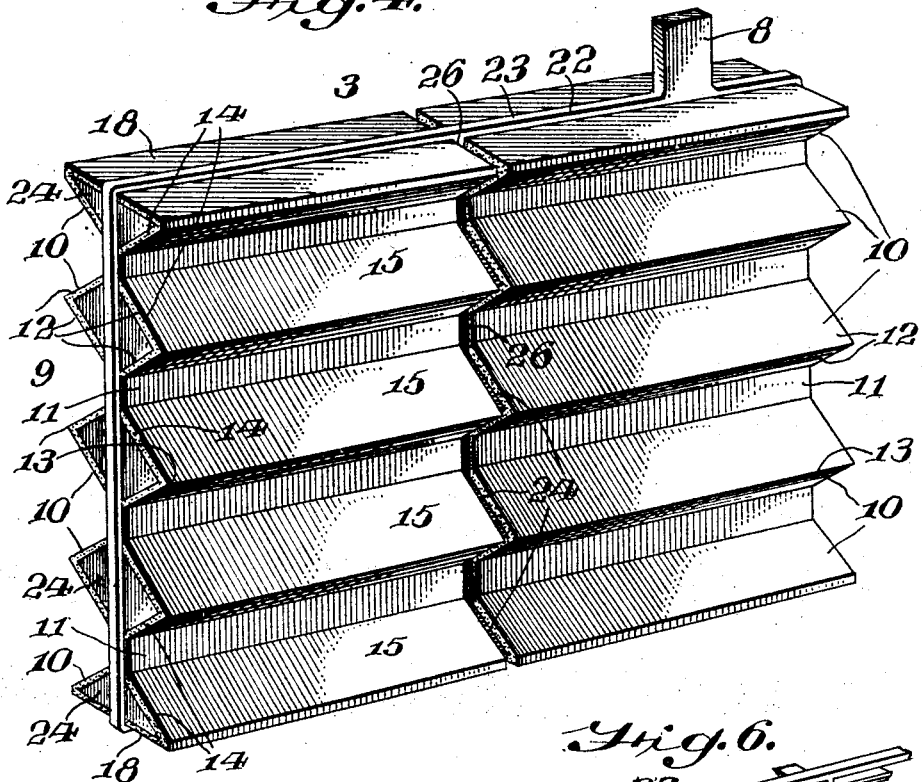

WILLIAM KNOBLOCK, OF PHILADELPHIA, PENNSYLVANIA, ASSIGNOR OF ONE-FOURTH TO CAROLA KNOBLOCK, ONE-THIRD TO WILLIAM J. GRAHAM, AND ONE-FOURTH TO JOHN LAMON, ALL OF PHILADELPHIA, PENNSYLVANIA, AND ONE-SIXTH TO DEMOUNT BATTERY CORPORATION, OF PHILADELPHIA, PENNSYLVANIA, A CORPORATION OF DELAWARE.

ELECTRIC STORAGE BATTERY.

1,409,895.      Specification of Letters Patent.      Patented Mar. 14, 1922.

Application filed May 2, 1918. Serial No. 231,989.

*To all whom it may concern:*

Be it known that I, WILLIAM KNOBLOCK, a citizen of the United States, residing in the city and county of Philadelphia, State of Pennsylvania, have invented a new and useful Electric Storage Battery, of which the following is a specification.

My invention relates to a novel electric storage battery more particularly to that of the secondary class, the principal object being to provide for conservation of space, increased efficiency, and practicability of the battery. To produce such results, I provide a battery made up of a series of positive and negative electrodes of my novel design, each electrode consisting of a container or tubular grid formed of a plurality of hollow bodies spaced apart and integral with each other, and active material contained in said hollow bodies, a conductor formed longitudinally around said electrode and provided with cross members extending through and imbedded in the active material contained in the hollow bodies, the conductor being also provided with cap plates to provide closures for the open ends of said hollow bodies to retain the active material therein.

A further object of my invention is to provide a battery consisting of a series of positive and negative electrodes, each electrode formed of a plurality of hollow bodies for containing the active material, the faces of said electrodes of such raised and depressed formation whereby the opposed electrodes in the assembly of the battery overlap with each other and are properly spaced apart by each other to afford a passageway for the electrolyte.

A still further object of my invention is to provide an electrode, the active material container or grid thereof consisting of a plurality of horizontally arranged hollow bodies or polygonal tubes connected together by central vertical webs, the outwardly converging walls of the hollow bodies producing raised and depressed portions on the faces of the plate, whereby the faces of the opposed plates overlap with each other in the assembly of the battery, the apices or outermost extremity of the outwardly converging walls of the hollow bodies contacting with the central webs to properly space the electrodes from each other.

Another object of my invention is to provide an electrode of this character that may be produced from one or more tubular container grids, the conductor affording a binding means for securing several of said container grids together, to form the unit electrode.

Furthermore, another object of my invention is to provide an electrode consisting of a plurality of containers or grids for the active material, each of which is formed of a plurality of integral tubular bodies composed of a porous non-conducting material, the tubular bodies having a filling of active material set in at a point adjacent the ends of the tubes, the active material having an opening extending therethrough lengthwise of the tube, a conductor adapted to be longitudinally formed around the outside of the container, in the openings in the active material and in the set in portions at the ends of the tubular bodies to provide the unit frame for binding the several grid sections together to produce the unit electrode.

Figure 1 represents a side elevational view partly in section of a battery electrode embodying my invention.

Figure 2 represents a section on the line 2—2 of Figure 1, showing the assembly of a series of electrodes of positive and negative polarity.

Figure 3 represents an end view of the electrodes assembled.

Figure 4 represents a perspective view showing one of the electrodes made up of several hollow body sections or container grids bound together by a conductor completely encircling the electrode and provided with cores extending through the hollow bodies wherein the active agent is contained together with closure caps of the ends of the hollow bodies.

Figure 5 represents a fragmentary perspective view of one hollow body section of the electrode with a filling of active agent, the active material being cored and set in adjacent the ends of the hollow bodies for the reception of the conductor core and closure caps formed with the conductor.

Figure 6 represents a fragmentary perspective view showing the form the conductor assumes in the finished electrode.

Similar numerals of reference indicate corresponding parts in the figures.

Referring to the drawings.

1 designates a battery of the secondary class made up of a series of positive and negative electrodes 2 and 3, see Figure 2 of the drawings, the electrodes being supported together in a jar 4 containing the electrolyte, and connected together by the straps 5 and 6 secured to the lugs 7 and 8 formed with the conductor of the electrode.

The novel features of my improved electrode will best be understood by referring to Figures 2 and 4 of the drawings, wherein each electrode consists of a tubular container grid 9 of one or more sections, each grid formed of a plurality of hollow bodies or polygonal tubes 10, connected together by the central webs 11 integral therewith composed of a porous material, preferably earthenware, of non-conducting qualities.

The formation of the faces of the electrodes consists of the outwardly converging walls 12 of the hollow bodies or polygonal tubes 10 meeting at a common apex 13 forming the raised portions 14 on the faces of the electrode, while between each of the hollow bodies 10 the opposed converging walls form depressions or pockets 15 into which the raised portion 14 of a hollow body of an adjacent opposed electrode is adapted to overlap and be positioned in respect thereto by the apexes 13 of the respective hollow body sections, engaging the webs 11.

Between the side walls 12 and the webs 11 of the opposed electrode in their assembled position, channels or passageways 16 are effected for the circulation of the electrolyte.

The end electrodes of the assembled battery as best seen in Figure 2 are formed with flat outer surfaces 17, the same being true of the upper and lower portions of the several electrodes as indicated at 18 to accomplish symmetry in the assembly of the plates for positioning in the jar and also proper distribution for the active material of the opposed electrodes to produce the best results without an excess of active material.

19 designates active material adapted to be contained in and supported by the hollow bodies 10 of the electrode. The active material 19 is provided with an opening 20 throughout its length, and is spaced from the ends of the hollow bodies as shown at 21.

22 designates the metallic conductor for the electrode and consists of the continuous band 23 which encircles the electrode longitudinally thereof and has formed therewith the closure caps 24 which are adapted to seat in the space 21 of the hollow body portion 10 closing the ends thereof to retain the active material, and also provide conducting means for said active material.

25 designates cores secured to the closure caps 24 and which are adapted to be positioned within the openings 20 above mentioned, of the active material 19, said cores providing for the conducting of energy of the active material throughout the entire length of the hollow body to the main conductor frame 23.

26 designates an intermediate vertical bar formed with the continuous conductor 23, see Figure 1 of the drawings, for uniting several grids or containers together at the intermediate open ends to insure efficient conductivity, and to provide binding means for the several sections.

This manner of utilizing several grid sections in building up the unit electrode is most desirable for the efficiency of the conductivity of the electrode and also most practical in the formation of the hollow body sections in that the sections may be made in reduced lengths thereby resulting in added strength and greater facility in the application of the active material in the hollow bodies thereof.

It will therefore readily be seen that I may utilize one or any number of hollow body sections or grids in making up a unit electrode.

The tubular grids are preferably made from material possessing by nature the porous and non-conducting properties, it being understood however that I do not restrict myself to such, but may resort to mechanical or chemical means to produce the same result.

The operation of my novel electrode in connection with a battery preferably of the secondary class will readily be appreciated in that I have provided an electrode of the highest efficiency and practicability, the feature of the overlapping faces of the opposed electrodes insuring a conservation of space and therefor a proportional increase in the carrying capacity of the active material of the battery, while the regularity in the formation of the faces and the novel separating means in said faces provides for the uniform spacing apart of the electrode thereby effecting a uniform circulation of the electrolyte throughout the battery. These features together with the forming of the tubular grids for containing the active agent of porous non-conducting material enables the electrolyte to permeate into the active agent, the novel containing means for the active agent also insuring against short circuiting of the battery.

The novel arrangement of the metallic conductor in respect to the active agent contained in the grid insures most efficient conducting of energy and also provides a most practical binding means where more than one grid section is used in making up a unit electrode.

It will be understood from the foregoing that each electrode consists of a grid having polygonal shaped walls, each forming a series of tubes, as will be understood by reference to Figure 4. The polygonal shaped walls preferably converge outwardly as seen in Figures 2 and 3, so that the polygonal shaped walls at one side of the positive electrode are nested in the space formed by the polygonal shaped walls at the side of a juxtaposed negative electrode. These polygonal shaped walls are spaced from each other and overlap. Each electrode is preferably constructed substantially the same as that seen in figure 4, and this may be either a positive or a negative electrode.

Having thus described my invention what I claim as new and desire to secure by Letters Patent, is:—

1. An electric storage battery which comprises in combination a series of positive and negative electrodes, each electrode consisting of a tubular grid composed of porous non-conducting material for containing the active material, a conductor for said active material formed with said electrode, and means on the opposed faces of said electrodes for providing engagement therebetween to retain said faces in spaced relation.

2. An electric storage battery which comprises in combination a series of positive and negative electrodes, each electrode comprising a tubular grid consisting of a plurality of tubes composed of a porous non-conducting material, said tubes being adapted to contain the active material, a conductor extending longitudinally around the grid and formed with closure caps for the open ends of said tubes, horizontal cross members formed with said conductor and imbedded in and extending through the active material contained in the said tubes, said electrodes being arranged in staggered relation in the assembly of the battery, and means on the faces of said electrodes for retaining the opposed electrodes in spaced relation thereto to effect uniform passageways for the electrolyte.

3. An electric storage battery which comprises in combination a series of positive and negative electrodes, each electrode comprising a tubular grid and composed of a porous non-conducting material, said tubes being adapted to contain the active agent, a conductor extending longitudinally around the grid and formed with closure caps for the open ends of said tubes, horizontal cross members formed with said conductor and imbedded in and extending through the active material contained in the said tubes, the confining walls of said tubes forming in regularity raised and depressed portions on the faces of said electrode, said electrodes being arranged in staggered relation in the assembly of the battery, means on the faces of said electrodes for spacing apart the walls of said tubes of the opposed electrodes to effect uniform passageways for the electrolyte, and means whereby the opposed walls of said tubes of the opposed electrodes are arranged in parallelism.

4. An electric storage battery which comprises in combination a series of positive and negative electrodes, each electrode consisting of a tubular grid composed of porous non-conducting material, said grid consisting of a plurality of horizontal polygonal tubes connected together and equidistantly spaced apart by central vertical webs integral therewith, said tubes adapted to contain the active agent, a conductor extending longitudinally around and formed with said grid, said conductor being provided with horizontal connecting members imbedded in and extending through the active material contained in said tubes, cap plates on said conductor for closing the ends of said tubes, the walls of said tubes converging outwardly from said central webs forming in regularity raises and depressions on the faces of the electrode, and means whereby the outermost transverse apices of said polygonal tubes contact with the central webs of opposed electrodes to retain the walls of the tubes in spaced relation for the circulation of electrolyte therethrough.

5. An electrode for storage batteries which comprises a tubular grid composed of porous non-conducting material said grid formed of a plurality of tubes spaced apart and connected together by central webs integral therewith, active material adapted to be supported by and contained within said tubes, a conductor extending around said grid and extending through said tubes and imbedded in the active material contained therein, closure caps formed with said conductor for closing the open ends of said tubes to retain the active material therein.

6. An electrode for storage batteries which comprises a hollow non-conducting body member provided with alternate elevations and depressions on opposite faces thereof, means for retaining active material in said hollow body member, and a conductor for said active material.

7. An electrode for storage batteries which comprises a tubular grid composed of a porous non-conducting material, said grid formed of a plurality of tubes spaced apart and connected together by webs integral therewith, active material adapted to be supported and contained within said tubes, and a conductor passing longitudinally around said grid and through said tubes.

8. An electrode for storage batteries which comprises a tubular container grid composed of a porous non-conducting material, said grid formed of a plurality of tubes spaced apart and connected together by webs integral therewith, active material adapted to be supported and contained within said tubes, a conductor passing longitudinally around said grid and through said tubes, and means on said conductor forming closures for the open ends of said tubes to retain the active material in the tubes.

9. An electrode for storage batteries which comprises a tubular grid of porous non-conducting material, said grid formed of a plurality of polygonal tubes spaced equal distances apart, and connected together by vertical webs, active material adapted to be supported by and contained within said tubes, a conductor longitudinally extending around said grid and through said tubes and imbedded in the active material contained therein, closure caps formed with said conductor for closing the open ends of said tubes to retain the active material therein, the walls of said tubes and said vertical webs forming in regularity raises and depressions on the faces of said electrode.

10. An electrode for storage batteries which comprises a tubular grid of porous non-conducting material, said grid formed of a plurality of horizontal rectangular tubes spaced equal distances apart and connected together by central vertical webs, active material adapted to be supported by and contained within said tubes, a conductor formed longitudinally around said grid and provided with cross connecting members extending through said tubes and imbedded in the active material contained therein, closure caps formed with said conductor and seating in the open ends of said tubes to retain the active agent in the tubes, the walls of said rectangular tubes converging outwardly from the said webs to form in regularity alternately raised and depressed portions on the opposite faces of the grid.

11. An electrode for storage batteries which comprises a plurality of tubular grids composed of porous non-conducting material, each grid formed of a plurality of tubes spaced apart and connected together by webs integral therewith, active material adapted to be supported by and contained within said tubes, a conductor extending longitudinally around said grids to bind them together, said conductor formed with cross members imbedded in and extending through the active material contained in the tubes of said grid, and closure caps formed with said conductor for closing the open ends of said tubes to retain the active material therein and bind said tubular grids together.

12. An electrode for storage batteries which comprises a plurality of tubular grids composed of a porous non-conducting material, each of said grids formed of a plurality of polygonal tubes spaced equal distances apart and connected together by central vertical webs integral therewith, active material adapted to be supported by and contained in said tubes, said tubes of the grids being in alignment with each other, a conductor formed longitudinally around and binding said grids together, said conductor being provided with cross connecting members extending through said tubes and imbedded in the active material contained therein, closures on said conductor adapted to be seated in the open ends of said tubes of the several grids to retain the active agent therein, the walls of said rectangular tubes converging outwardly from said central webs to form in regularity alternately raised and depressed portions on the opposite faces of said electrode.

13. An electrode for storage batteries which comprises a tubular grid of porous non-conducting material, said grid formed of a plurality of polygonal tubes spaced equal distances apart, and connected together by vertical webs, active material adapted to be supported by and contained within said tubes, a conductor longitudinally extending around said grid and through said tubes and imbedded in the active material contained therein, and closure caps formed with said conductor for closing the open ends of said tubes to retain the active material therein.

14. An electric storage battery having positive electrodes and negative electrodes the juxtaposed faces of adjacent electrodes overlapping.

15. An electric storage battery having positive and negative electrodes with overlapping faces, spaced from each other to form an open space for the electrolyte.

16. An electric storage battery having positive electrodes and negative electrodes, the adjacent faces of which are parallelly disposed and overlap each other, overlapping parallelly disposed faces.

17. An electric storage battery having positive and negative electrodes having their sides forming a series of converging walls, the converging walls of a positive electrode being nested in the space formed by the converging walls of a juxtaposed negative electrode.

18. An electric storage battery having positive and negative electrodes each of which is tubular to receive the active agent and provided with polygonal shaped walls, with the walls of a positive electrode overlappng the walls of a negative electrode and spaced therefrom to form a space for the electrolyte.

19. An electric storage battery having positive and negative electrodes, each of which consists of a plurality of polygonally shaped cells to receive the active material with the walls of juxtaposed positive and negative electrodes overlapping and spaced from each other to form a space for the electrolyte, and a conductor for each electrode extending through its tubes.

20. An electric storage battery having positive and negative electrodes each of which consists of a plurality of polygonally shaped cells to receive the active material, with the walls of juxtaposed positive and negative electrodes overlapping and spaced from each other to form a space for the electrolyte, and a conductor for each electrode extending through its tubes and closing the ends of said tubes.

21. An electric storage battery having positive and negative electrodes each of which consists of a plurality of polygonally shaped cells to receive the active agent, with the walls of juxtaposed positive and negative electrodes overlapping and spaced from each other to form a space for the electrolyte, and a conductor for each electrode extending through its tubes, closing the ends of its tubes and extending around such grid.

WILLIAM KNOBLOCK.

Witnesses:
    John A. Wiedersheim,
    N. Bussinger.